(12) United States Patent
Bar et al.

(10) Patent No.: US 9,678,531 B2
(45) Date of Patent: Jun. 13, 2017

(54) METHODS AND APPARATUS FOR ADAPTIVE TIME KEEPING FOR MULTIPLE TIMERS

(71) Applicants: Ron Bar, Ramat Hasharon (IL); Evgeni Ginzburg, Petah Tikva (IL); Eran Glickman, Rishon le Zion (IL)

(72) Inventors: Ron Bar, Ramat Hasharon (IL); Evgeni Ginzburg, Petah Tikva (IL); Eran Glickman, Rishon le Zion (IL)

(73) Assignee: NXP USA, INC., Austin, TX (US)

( * ) Notice: Subject to any disclaimer, the term of this patent is extended or adjusted under 35 U.S.C. 154(b) by 176 days.

(21) Appl. No.: 14/180,449

(22) Filed: Feb. 14, 2014

(65) Prior Publication Data

US 2015/0234419 A1    Aug. 20, 2015

(51) Int. Cl.
  *G06F 1/14*   (2006.01)
  *G06F 1/04*   (2006.01)
  *G06F 9/48*   (2006.01)

(52) U.S. Cl.
  CPC ............ *G06F 1/14* (2013.01); *G06F 1/04* (2013.01); *G06F 9/4825* (2013.01); *G06F 9/4881* (2013.01)

(58) Field of Classification Search
  CPC ........ G06F 1/04; G06F 9/4881; G06F 9/4825; G06F 1/14
  See application file for complete search history.

(56) References Cited

U.S. PATENT DOCUMENTS

| | | | | |
|---|---|---|---|---|
| 5,768,572 A | * | 6/1998 | George | G06F 9/4825 713/502 |
| 5,838,957 A | * | 11/1998 | Rajaraman | G06F 9/4825 713/502 |
| 6,115,826 A | * | 9/2000 | Kinkade | G06F 1/14 713/501 |
| 6,718,479 B1 | * | 4/2004 | Christenson | G06F 1/14 713/502 |
| 6,826,761 B1 | | 11/2004 | Damon et al. | |
| 6,912,712 B1 | * | 6/2005 | Myung | G06F 9/463 718/100 |

(Continued)

OTHER PUBLICATIONS

George Varghese and Anthony Lauck. 1997. Hashed and hierarchical timing wheels: efficient data structures for implementing a timer facility. IEEE/ACM Trans. Netw. 5, 6 (Dec. 1997), 824-834. DOI=http://dx.doi.org/10.1109/90.650142.*

(Continued)

*Primary Examiner* — Jaweed A Abbaszadeh
*Assistant Examiner* — Brian J Corcoran (57) ABSTRACT

A timer distribution module supports multiple timers and comprises: a command decoder arranged to determine expiration times of a plurality of timers; and a timer link list distribution adapter, LLDA, operably coupled to the command decoder. The LLDA is arranged to: receive a time reference from a master clock; receive timer data from the command decoder wherein the timer data comprises at least one timer expiration link list; construct a plurality of timer link lists based on at least one of: the timer expiration link list, at least one configurable timing barrier; dynamically split the link list timer data into a plurality of granularities based on the timer expiration link list; and output the dynamically split link list timer data.

20 Claims, 7 Drawing Sheets

(56) References Cited

U.S. PATENT DOCUMENTS

| | | | |
|---|---|---|---|
| 7,058,841 B2* | 6/2006 | Li | G06F 1/14 713/502 |
| 7,106,693 B1* | 9/2006 | Turner | H04L 47/568 370/230 |
| 9,032,408 B2* | 5/2015 | Dupont | G06F 1/14 718/102 |
| 9,092,143 B1* | 7/2015 | Bappe | G06F 11/3485 |
| 2008/0013450 A1 | 1/2008 | Worley et al. | |
| 2014/0298073 A1* | 10/2014 | Zhou | G06F 1/14 713/502 |

OTHER PUBLICATIONS

G. Varghese and T. Lauck. 1987. Hashed and hierarchical timing wheels: data structures for the efficient implementation of a timer facility. SIGOPS Oper. Syst. Rev. 21, 5 (Nov. 1987), 25-38. DOI=http://dx.doi.org/10.1145/37499.37504.*

* cited by examiner

METHODS AND APPARATUS FOR ADAPTIVE TIME KEEPING FOR MULTIPLE TIMERS

FIELD OF THE INVENTION

The field of this invention relates to methods and apparatus for adaptive time keeping, and in particular to large scale adaptive time keeping for integrated circuits employing multiple timers.

BACKGROUND OF THE INVENTION

As processing power and the number of supported applications increases in computer/digital/software based devices, there is an ever growing need for an increased number of timers that are operable to oversee a multitude of tasks within integrated circuit (IC) devices. However, as the number of timers increase, software solutions have become more expensive and less accurate. Hardware solutions to manage millions of timers running in parallel, which requires providing services for millions of counters, are problematic and often prohibitive in terms of cost, die space and power consumption.

Timers, generally, are counters that are fed with an initial duration value and a counting granularity, in order to create a 'timer' value. For example, a timer may be allocated a hundred time units, with a one second granularity, creating a one hundred second timer. Upon expiration of the timer, a timer node notifies the relevant timer creator that the timer has expired, and the relevant timer creator can proceed/process whatever it is programmed to do after expiration of the timer.

Different mechanisms are generally utilised for different timing duration distributions.

In the networking domain, millions of simultaneously running timers are generally utilised to manage networking flows and quality of service related aspects. Typically, in the network domain, timers would run with high resolution granularities (microseconds up to milliseconds) for relatively short durations.

In the domain of general purpose processors (GPP), for example tasks requiring switching/watchdog timers, a large amount of timers are also utilised to manage various applications. For typical GPP usage, there could be around tens of thousands of timers being run in parallel, which would generally be for lower resolutions (milliseconds up to seconds) and running for relatively long durations.

Generally, managing tens of thousands to millions of timers tends to require a large number of counters. These counters tend to take up a lot of silicon area and, therefore, cannot be physically located within the IC. Therefore, an algorithmic approach is generally utilised to manage the vast amount of timers, without having to physically represent the counters, which generally takes the form of timing rings/wheels.

Figure 1:
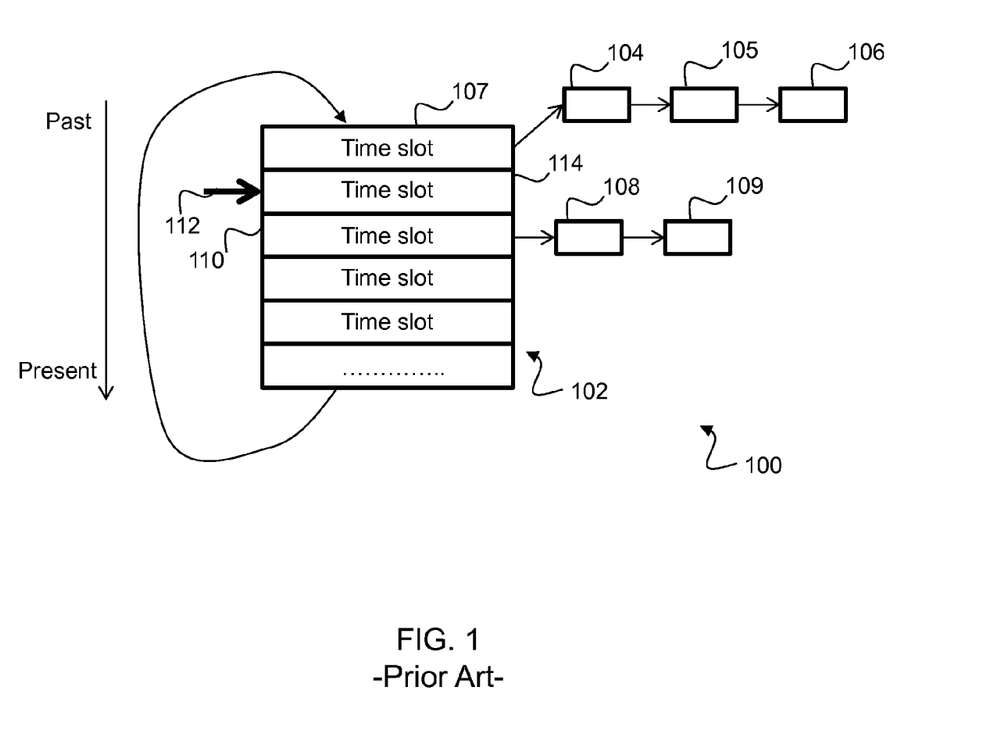
FIG. 1 schematically shows an example of a known simplified timing wheel.

Referring to FIG. 1, an example of a known timing wheel, comprising a simplified timing wheel, 100 is illustrated. Simplified timing wheel 100 comprises N number of slots 102, with six slots shown in this illustration, and a number of timers 104, 105, 106 associated with time slot 107, and timers 108, 109 associated with time slot 110. Each of the number of slots 102 represents a time unit, wherein a cursor 112 within the timing wheel 100 moves onto the next location every time unit, in the same manner as a second hand on a clock. In this case, the cursor 112 is currently located at timeslot 114, having previously been located at timeslot 107 at the previous time interval. When the cursor 112 moves onto timeslot 110, the timers 108 and 109 associated with timeslot 110 will expire at that instant, or when the cursor 112 reaches the timeslot 110 in subsequent cycles. The cursor 112 continues to increment onto subsequent time slots and wraps back to timeslot 107 after the cursor 112 increments past the final array entry.

The number of slots 102 in the timing wheel 100 has a limit that is defined by the array size of the timing wheel 100. For example, the maximum schedulable event that can be stored in the timing wheel could be 350 msec, but a 400 msec timing event needs to be stored. This leads to an overflow problem, wherein the 400 msec timing event cannot be stored.

As discussed above, different timing distributions require different timing mechanisms, resulting in potential problems if one mechanism is utilised for all timing distributions. In the networking domain, there is generally a need for millions of timers with short expiration times and a relatively small granularity, as they generally function in the 'microsecond up to millisecond domain'. However, GPPs generally require a relatively larger granularity, as they tend to function up to the 'second' domain. Therefore, timing wheels for GPPs that have a large granularity will waste a lot of power during operation, for example when they are being monitored at a higher granularity level and may provide higher accuracy than needed. Further, utilising networking domain timing wheels for GPPs, would require a large number of timing wheels, due to the relatively smaller granularity, resulting in a large and expensive overhead, which affects the overall power/performance of devices.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The illustrated embodiments should not be seen as limited to GPP and networking applications. These examples have merely been given to illustrate the functionality provided in the illustrated embodiments, and it is envisaged that the concepts herein described are applicable to any system that employs or supports multiple timer types and encompasses other timer types, such as security applications requiring expirations of secure processes for enhanced protection, or system management processes requiring tailor-made time keeping solutions for the proper maintenance of the system.

Further, the use and creation of new link lists in the illustrated embodiments is merely one example of supporting multiple timers and other list types and data structures are envisaged.

Figure 2:
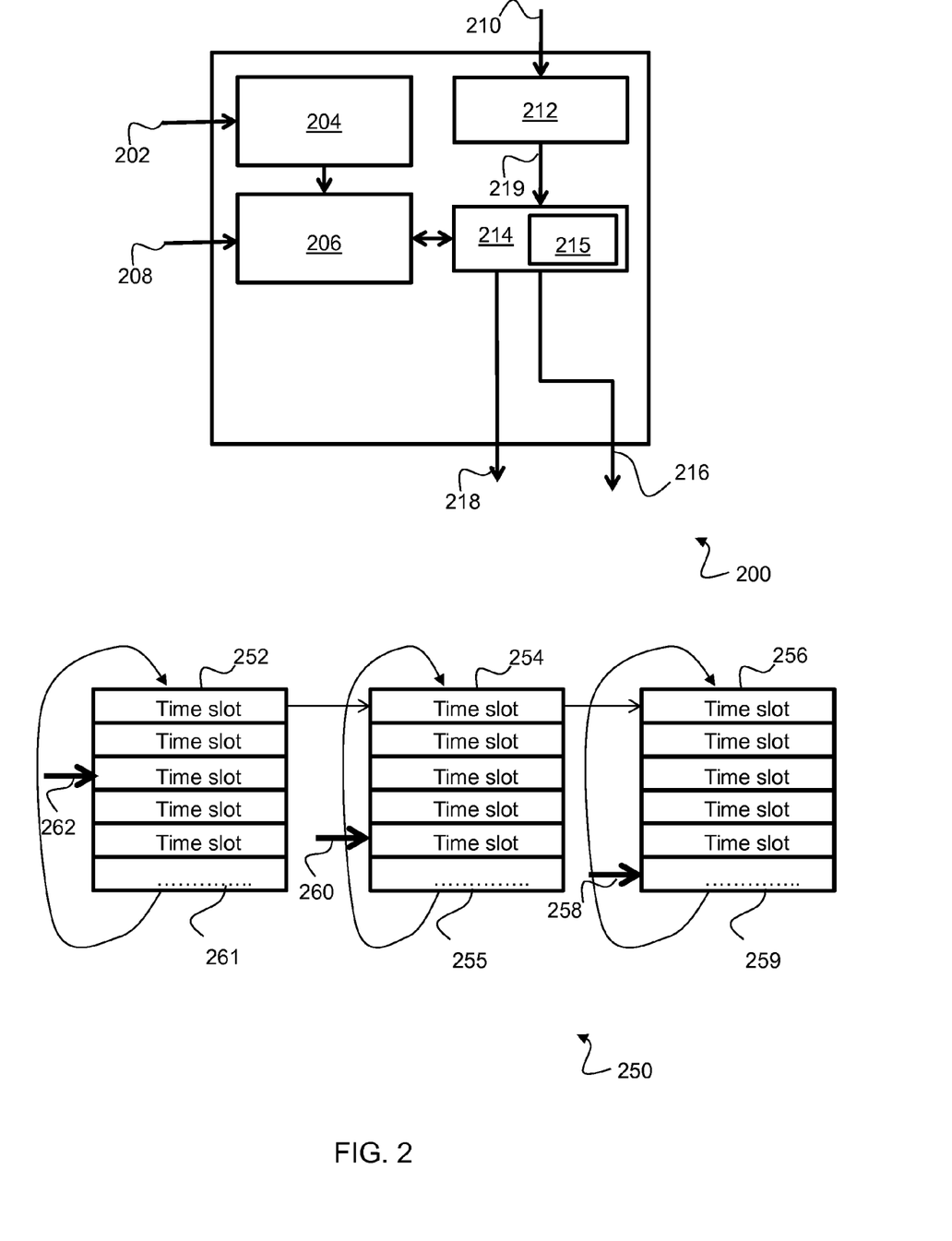
FIG. 2 schematically shows an example of a timer distribution module.

Referring to FIG. 2, an example of a timer distribution module 200 is illustrated, comprising a configuration module 204 operably coupled to a command decoder module 206, a clock, which may be a master wall clock (MWC) 212, operable to receive a control input 210, operably coupled to a link list distribution adapter module (LLDA) 214, which may, in some further examples be operably coupled to the command decoder module 206. In this example, the MWC may be a free running wall clock, which is operable to generate an 'n' bits wide counter. The counter may take the form of, for example, 'hours: minutes: seconds: milliseconds: microseconds', wherein each part relates to a different granularity of the counters.

The configuration module 204 may be configured via an external system host 202, and may be operable to configure timing barriers through a table of 'M' values, wherein each 'M' value may define a specific barrier. In some examples, the number of barriers to be configured may be dependent on the timing configuration. For example, for GPP domain applications, a single barrier may be implemented, which may allow for a linear distribution of timers. In some other examples, multiple barriers may be utilised for networking domain applications, which may allow for a narrow distribution of hardware timers link lists.

The command decoder module 206 may receive timer management commands from the configuration module 204, for example create, delete, etc., and may be operable to align an expected expiration time according to a defined timing granularity. Subsequently, in some examples, the command decoder module 206 may be required to insert a timer into a chosen link list. Further, in some examples, it is envisaged that the command decoder module 206 may receive timer creation and/or timer deletion commands.

In some examples, the LLDA 214 may be operable to receive timer data, including a timer expiration value and the relevant chosen link list, from the configuration module 204, as well as receive counter data from MWC 212. Subsequently, the LLDA 214 may create timer context records and transmit 218 the records to memory (not shown), for example double data rate (DDR) synchronous dynamic random-access memory (SDRAM). The LLDA 214 may utilise counter data from the MWC 212, which may comprise wall clock timing ticks, to facilitate accurate timing handling.

In some examples, if a timing event, which may hold a link list of timers, is about to expire, the LLDA 214 may be operable to output expiration notifications through a bus 216, which may be a dedicated event expiration bus.

In some further examples, the LLDA 214 may perform link list construction and transmit 218 the constructed link list to memory, which may be an external memory. In other examples, the LLDA 214 may perform link list construction at external memory and, in some examples, create a timer context record in the (external) memory. The link list construction may be dynamically performed for each user configured granularity.

In some examples, a user may configure a number of barriers that he wishes to utilise, which may depend on the application, for example GPP, etc. Therefore, the number of granularities will be configured based on the user's determined number of barriers.

For each barrier that the user wishes to utilise, a place/index of the signal from the MWC 212 needs to be provided. For example, if a user decided to divide the processed reported signal from the MWC 212 into three fields, then the user would need to configure at least two barriers. The first barrier may be at, say, index (bit) 23 and the second barrier may be at, say, index (bit) 43.

The above example results in a 64-bit [63:0] MWC 212, which comprises three regions, namely a high granularity region [63:43], a medium granularity region [42:23], and a low granularity region [22:0].

In some examples, the LLDA 214 may receive and analyse one or more commands from the command decoder module 206. In some examples, the one or more commands may comprise at least a future expiration date for a timer context record and, therefore, the LLDA 214 may be operable to utilise wall clock barriers/dividers from clock 212 to determine a suitable granularity link list to define where the context record should be positioned.

After the above operation has been completed, and a relevant link list has been 'built', a standard 'add to link list tail flow' may be utilised for subsequent operations.

In some examples, a user may be required to configure aspects of the clock 212 prior to the LLDA 214 'building' relevant link lists. For example, the user may be required or provided with the ability to determine how many barriers are going to be valid inside the clock 212 and thereafter determine or set indexes for each of the determined barriers.

The user configured aspects of the clock 212 may be utilised by the LLDA 214 when 'building' relevant link lists. For example, the LLDA 214 may receive a 'timer create' command from the command decoder module 206, and subsequently may normalise a time duration with respect to a granularity into a basic expiration date. Subsequently, this basic expiration date may be inspected by the LLDA 214 according to the user configured barriers and, in this manner, the LLDA 214 may be operable to place a context record in a suitable position.

Thus, granularities may be able to be customised for each timing event. As a result, the timer distribution module 200 may be able to support a wide range of timing events, which may have a significant variation in granularities and durations. For example, as discussed above, this is in contrast to current devices that are only set up for use with a particular domain timing event, for example GPP domain or networking domain timing events, which represent examples of two vastly different domain timing events.

In some examples, when utilising an LLDA 214, timer expiration link lists may be able to be dynamically split into finer granularities at dynamically required positions, thereby allowing the timer distribution module 200 to handle various timing events. This may increase the flexibility and reduce the complexity of incorporating timer distribution modules 200 into device architecture.

For example, timer distribution module 200 may, initially, be configured to function within the GPP domain. Therefore, in such a scenario, the LLDA 214 may initially utilise a relatively coarse granularity, and operate using a timing wheel that may be similar to simplified timing wheel 100 of FIG. 1.

However, during operation, the timer distribution module 200 may be subsequently required to operate in a different timer domain, for example a networking domain. As known, current timing wheels that are designed for a particular application, for example, GPP domain usage are not adequate for other types of timing domains, generally because the granularity is too coarse and this leads to poor accuracy.

However, utilising the LLDA 214, the granularity and position of altering the granularity may be dynamically controlled. For example, initially, the LLDA 214 may have utilised timing wheel 252 for supporting GPP domain applications. In some examples, the timing wheel 252 may represent 'seconds' of a counter of clock 212. Therefore, for GPP applications, the timing wheel 252 may be suitable. However, if the timer distribution module 200 is required to support a different time domain application, for example a networking domain application, the LLDA 214 may initiate further timing wheels, for example timing wheels 254, 256, in order to support one or more networking domain applications.

It is known that an overflow problem and/or an accuracy problem can occur in traditional systems when a tailor-made timer distribution module for GPP applications is utilised for finer granularity applications, such as networking applications. Therefore, in some examples, the LLDA 214 may be configured to initiate, say, timing wheel 254, which may represent milliseconds, and/or timing wheel 256, which may represent microseconds, depending on the current scenario. Therefore, in this manner, dynamically altering the granularity of the available timing wheels may enable the timing distribution module 200, incorporating the LLDA 214, to support various timing applications that require different granularities, whilst still maintaining accuracy and/or efficient memory usage.

In this example, during initial operation, timing wheel 252 may be utilised, which may comprise 'N' number of slots, with six slots shown in this illustration. Each time slot 261 may comprise a number of timers associated with a particular time slot 261. Each of the number of slots represents a time unit, wherein a cursor 262 moves onto the next location every time unit, i.e. pointing to the next time slot. During a subsequent operation, timing wheels 254, 256, may be utilised, for example if the timer distribution module 200 is to be utilised for a different timing application. Therefore, the LLDA 214 may initiate these further timing wheels 254, 256 in order to alter the available granularity of the timer distribution module 200.

In this example, utilising timing wheels 252, 254, 256, networking domain applications may be able to be supported as well as coarser granularity timing applications, without sacrificing accuracy or memory usage. For example, a cursor 258 may transition between time slots 259, which may represent, microseconds, and wrap around to the beginning of the timing wheel 256 when the cursor 258 reaches the end of timing wheel 256. Subsequently, a cursor 260 from timing wheel 254 may transition a time slot 255 every time the cursor 258 wraps around to the beginning of timing wheel 256. Further, the cursor 262 may transition a time slot 261 when the cursor 260 wraps around to the beginning of timing wheel 254. Therefore, utilising the LLDA 214, granularities of timer distribution module 200 may be dynamically tailored to the specific requirements of timer applications.

In some examples, the number of time slots in each of the timing wheels 252, 254, 256 may vary and, therefore, cursors 262, 260, 258 may not necessarily transition based on a wrap around of a previous cursor.

Further, in some examples, the LLDA 214 may, as well as changing the granularity of the timer distribution module 200, be further operable to dynamically determine the position of barriers, which may result in determining where link lists are split.

For example, the LLDA 214 may receive commands transmitted via the command decoder module 206, and execute, and in some examples decode, the received commands. Additionally, a data base may be 'built' at external memory.

The received commands transmitted via the command decoder module 206 may have initially been formed in conjunction with the configuration module 204 receiving and outputting configuration information, which may have been transmitted from external system host 202, to the command decoder module 206, and by the command decoder module 206 receiving timer commands, for example timer commands 208.

Further, the LLDA 214 may receive a number of ticks, for example a time unit tick 219, from clock 212. For each time unit tick 219, a timer expiration module 215 within the LLDA 214 may check 218 if a link list is available, which may be at external memory, for a particular time unit tick 219. If the LLDA 214 determines that there is a link list available for the particular time unit tick 219, the LLDA 214 may notify timers related to the available link list that they have expired. In some examples, the timer expiration module 215 may fetch 216 the entire link list that is available for the particular time unit tick 219, in order to be able to notify relevant timers about the expirations. If the LLDA 214 determines that there are no relevant link lists for the particular time unit tick 219, the LLDA 214 may wait for the next tick from clock 212.

In some examples, the LLDA 214 may continue to fetch 216 relevant link lists until the link list ends.

Figure 3:
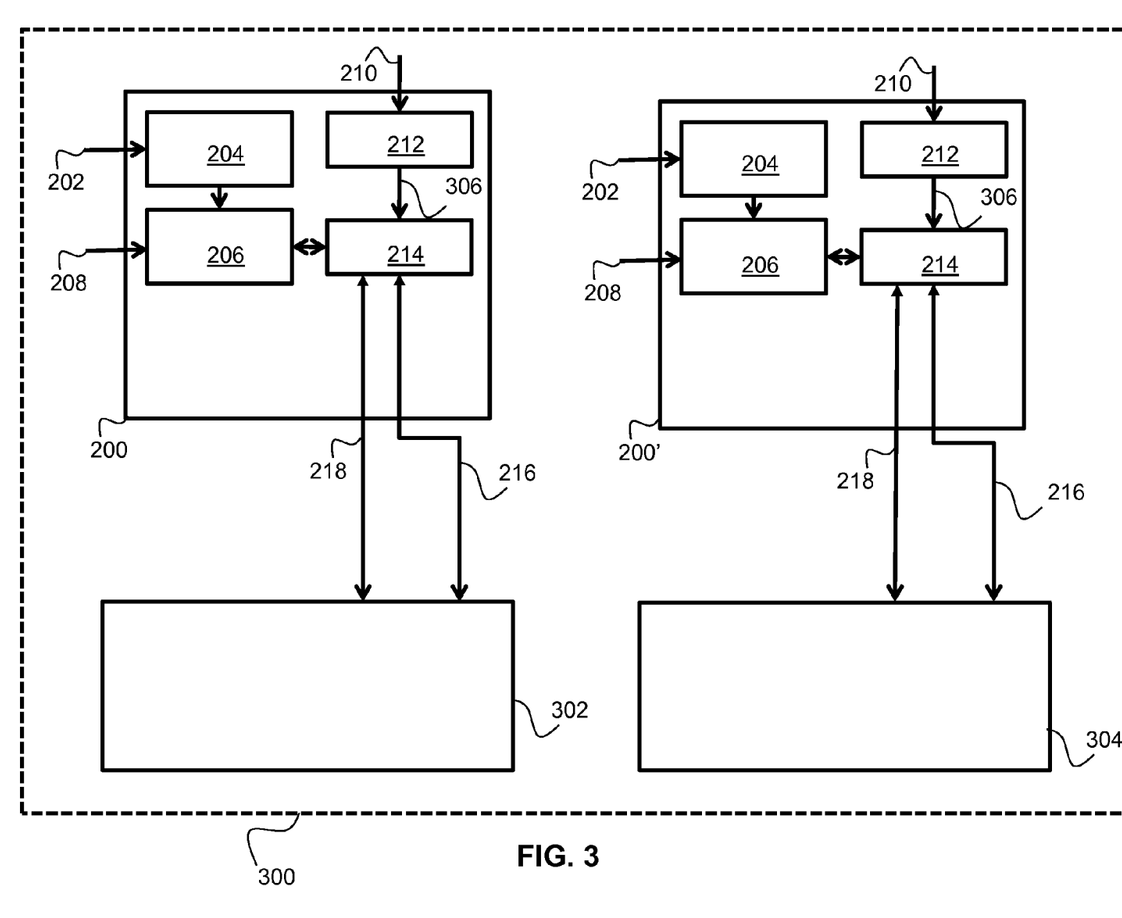
FIG. 3 schematically shows a further example of a timer distribution module.

Referring to FIG. 3, an example of a further timer distribution module 300 is illustrated, comprising two timer distribution modules 200, 200' from FIG. 2. In some other examples, the timer distribution module 300 may comprise more or less than two timer distribution modules 200, 200', which may depend on external system constraints.

In this example, a first timer distribution module 200 may be operably coupled to a GPP entity 302, and a second timer distribution module 200' may be operably coupled to a networking entity 304.

It is known that a timer distribution module in known systems, which is tailor-made for operation with, for example, a GPP entity, is unable to accurately operate with entities requiring a different granularity, for example, a networking entity due, in part, to its use of a fixed granularity.

However, in some examples and by utilising LLDA module 214, the first timer distribution module 200 and second timer distribution module 200' may be operable to dynamically alter the granularity output to GPP entity 302 and networking entity 304, without any hardware modification between timer distribution modules 200, 200'. Therefore, by dynamically modifying output information from the LLDA module 214, the first timer distribution module 200 may be operable to support GPP entity 302, whereas second timer distribution module 304 may be operable to support networking entity 304.

In this example, the MWC 212 may report the current time in a physical counter that is output 306 to the LLDA 214, where the physical counter may be 'n'-bits wide. In this manner, the LLDA 214 may dynamically determine whether to utilise the output 306 in full, facilitating a granularity suitable for GPP entity 302, or divide the output 306 into a number of smaller values, thereby reflecting different granularities that may be suitable for networking entity 304.

In some examples, the mechanisms to divide a received physical counter may be one or more timing barriers. Each time barrier may specifically describe a timer wheel that may handle relevant timers.

Thus, utilising the LLDA 214 in first timer distribution module 200 and the second timer distribution module 200', may allow for different granularities of timer applications to be supported. Therefore, utilising the LLDA 214 may allow for each of the first 200 and second 200' timer distribution modules to be utilised for the same or different timing applications.

In some examples, a single timer distribution module 200, 200' may be utilised to support a GPP entity 302 and a networking entity 304 at different times. However, for concurrent operations, separate timer distribution modules 200, 200', which may be configured dynamically for either supporting GPP entity 302 or networking entity 304, may need to be utilised.

Further, in some other examples, timer distribution module 200 may be further configured to support networking entity 304, and timer distribution module 200' may be further configured to support GPP entity 302.

It should be noted, that embodiments are not limited to GPP and/or networking modes. These applications were chosen to illustrate aspects of the invention as they represent examples of different timer needs, with respect to accuracy, duration etc. As a result, some example aspects may be suitable for a variety of fields that may utilise characteristics somewhere between or above GPP and networking modes.

Figure 4:
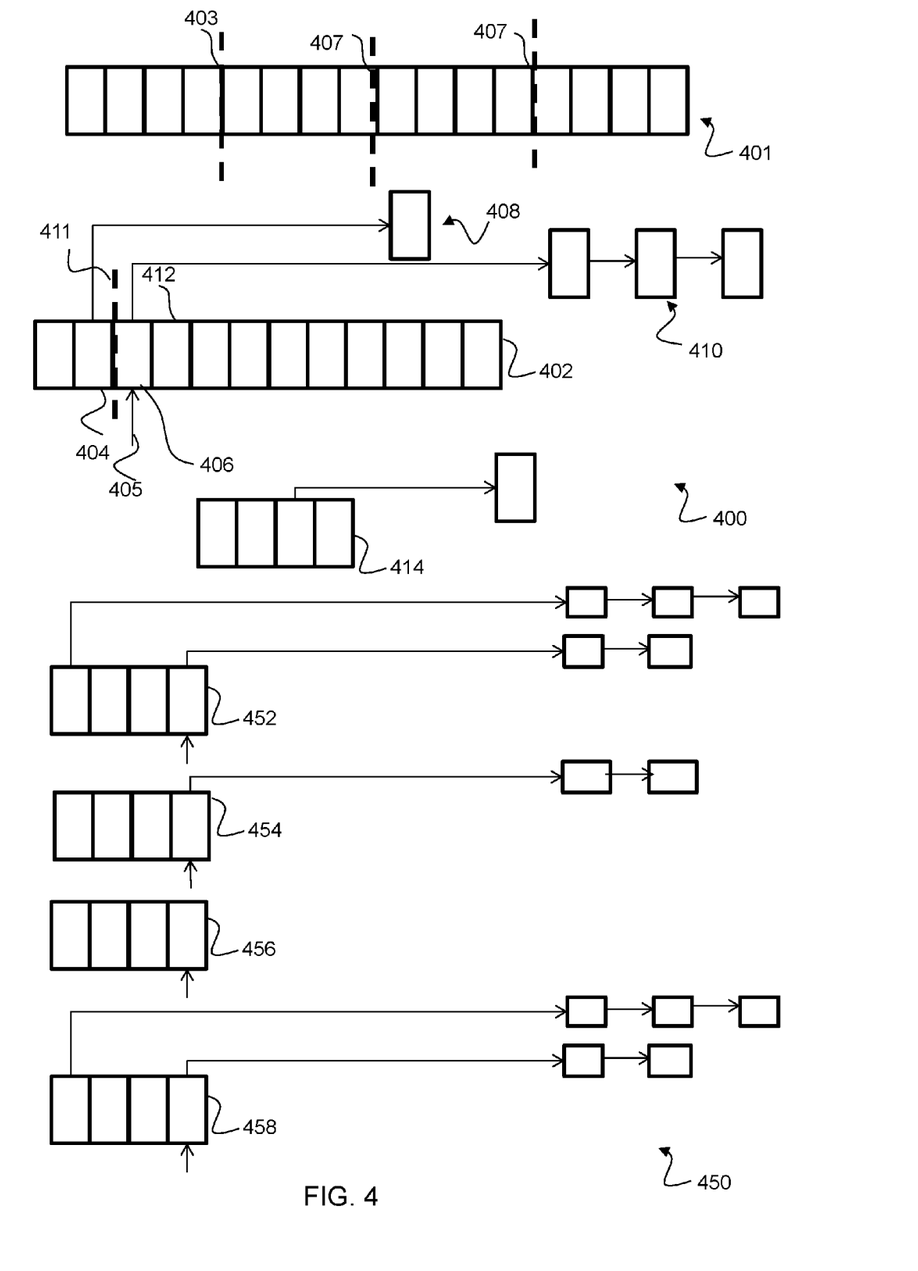
FIG. 4 schematically shows an example of a simplified timer wheel/ring for a GPP application and a simplified timer wheel/ring for a networking application.

Referring to FIG. 4, an example timer wheel 401 is illustrated, with corresponding divided simplified timer wheels for a GPP application 400 and a networking application 450.

Initially, example timer wheel 401 may comprise an N-bit (time slot) array, which in this example may be a sixteen-bit array for explanatory purposes. The size of timer wheel 401 may be incompatible/non-ideal for some applications and, therefore, an LLDA, for example LLDA 214 from FIGS. 2 and 3, may be utilised to dynamically assign one or more barriers 403 to the timer wheel 401. In some examples, the number of barriers may be implementation/application specific.

For example, if timer wheel 401 is to be utilised with a GPP application, it may be beneficial to implement a single barrier 403 at a particular point on the timer wheel 401.

In this example, for illustrative purposes, barrier 403 has been positioned after the fourth bit in example timer wheel 401. This may result in the example timer wheel 401 being split into timer wheel 414 comprising 4 bits, and timer wheel 402 comprising X-4 bits. Each element within timer wheel 402 may be associated (e.g. point) to a link list, for example link lists 408, 410, which may later be spread between bits of timer wheel 414 upon reaching a relevant point in time.

In this example, a cursor 405 may be initially positioned on the third bit 406, indicating that any timers in linked list 410 may be due to expire.

In some examples, the LLDA 214 from FIGS. 2 and 3 may be operable to dynamically assign one or more barriers 403, which in this illustrated example is one barrier after the fourth bit 412. The barrier 411 in this example may separate linked lists 408, 410 with a first granularity from subsequent linked lists with a future second granularity, pointed to by the bits situated after the barrier 411.

Therefore, the LLDA 214 may be operable to dynamically determine the number of barriers to be inserted, and the position of those barriers, as, for example, is illustrated for FIGS. 2 and 3.

In some examples, the timer wheel 401 may be utilised with an application that requires more than one barrier, for example a networking application. Therefore, in this example, a number of barriers may be utilised.

For illustrative purposes, two further barriers 407 have been positioned within timer wheel 401, amounting to a total of three barriers 407, 403. The position and number of barriers in this example are purely illustrative.

In some examples, the LLDA 214 may be operable to dynamically switch from a first timer type application to a second timer type application, e.g. from the GPP application 400 operation to the networking operation 450.

The combination of the three barriers 403, 407 in this example, results in a four-way split of resultant timer wheels, 452, 454, 456, 458.

In this example, the size of the resultant timer wheels 452, 454, 456, 458 have been illustrated with an equal number of bits. This is purely for illustrative purposes, and the resultant timer wheels 452, 454, 456, 458 may be any size that can be determined by the initial size of timer wheel 401 and position and number of barriers 403, 407.

In some examples, the resultant timer wheels 452, 454, 456, 458 may form a hierarchical structure of hierarchical rings, wherein, for example, timer wheel 452 may represent 'days', timer wheel 454 may represent 'hours', timer wheel 456 may represent 'minutes' and timer wheel 458 may represent 'seconds'.

Therefore, in some examples, the LLDA 214 may be operable to dynamically assign any number of barriers and dynamically determine the position of those barriers, thereby allowing the LLDA 214 to redefine the granularity of a timer distribution module incorporating the LLDA 214.

Therefore, in this manner a timer distribution module utilising the LLDA 214 may allow for a re-configurable device, which may be operable to support different granularities of timing applications without the need to modify the hardware of the timer distribution module.

Such a timer distribution module utilising the LLDA 214 may be utilised for system on a chip (SoC) applications, for example. A SoC is an integrated circuit that integrates all components of a computer or other electronic system into a single chip. A SoC generally comprises both hardware and software for controlling, for example, a microcontroller, microprocessor or digital signal processing (DSP) cores, peripherals and interfaces. Therefore, by providing a timer distribution module, which may be able to dynamically assign any number of barriers and dynamically determine the position of those barriers, may provide a more flexible and efficient timing mechanism to be implemented.

Figure 5:
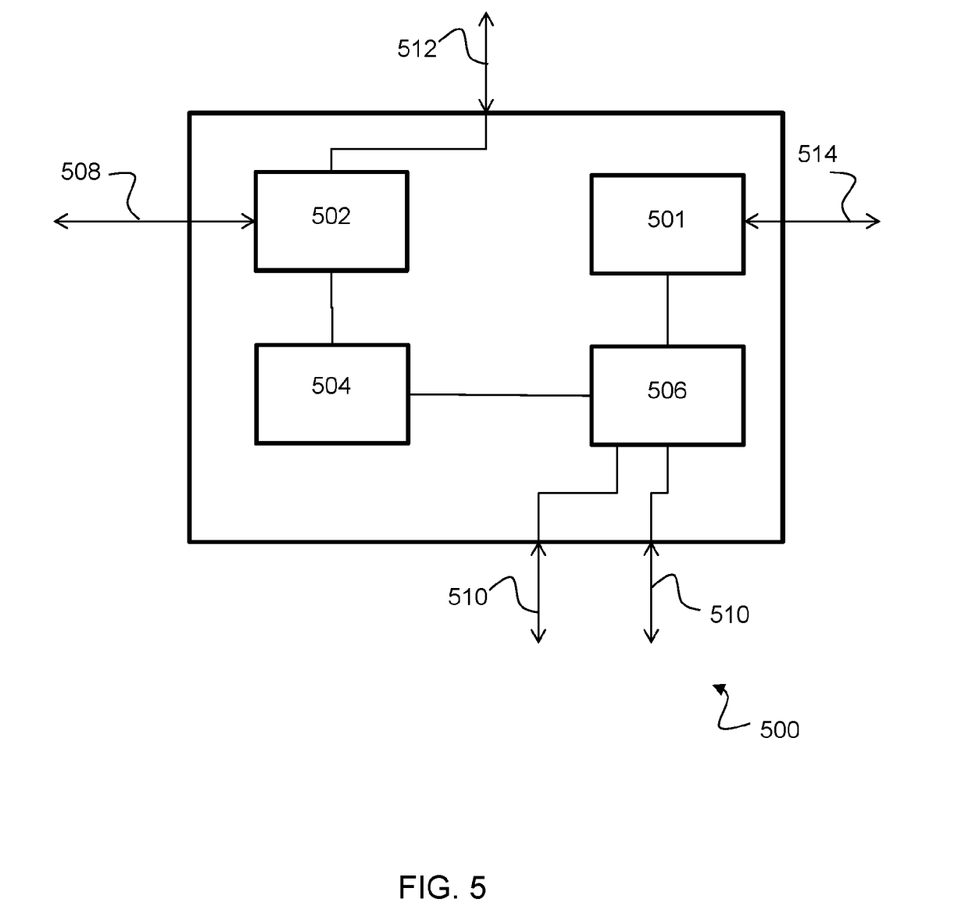
FIG. 5 schematically shows an example of a Link list distribution adapter.

Referring to FIG. 5, an example block diagram of a link list distribution adapter (LLDA) 500, such as the LLDA 214 of FIGS. 2 and 3, is illustrated. In some examples, the LLDA 500 may be similar to the LLDA 214 of FIG. 2. In this case, the LLDA 500 may be an internal block instantiated under a TDM module 200 hierarchy. In this example, the LLDA 500 may provided with one or more inputs from the TDM module 200, which for example may comprise one or more of user configuration commands for selection of barriers, generated signals from MWC 212 and other user commands.

In this example, the LLDA 500 may have one or more modes of operation. A first mode of operation may comprise command execution functionality and a second mode of operation may comprise expiration notification functionality.

The LLDA 500 may comprise, at least:

an expiration module 501 that is operable to determine if a link list is available, for example by reading and notifying expirations if a read link list is not empty, a receiver module 502 that is operable to receive commands, a decoder module 504 that is operable to decode commands received from the receiver module 502; and an execution module 506 that is operable to execute decoded commands from decoder module 504.

Referring to the first mode of operation, the LLDA 500 may initially be in an 'idle' state, awaiting timer commands 508 to be received by receiver module 502. If a timer command 508 is received by the receiver module 502, the LLDA may transition out of an idle state and into an active state. In response to this transition, the receiver module 502 may sample the received timer command 508 and determine any additional information supplied with the timer command 508.

After sampling the received timer command 508, the LLDA 500 may be operable to transmit the received timer command 508 onto the decoder module 504. The decoder module 504 may be operable to decode the timer command 508, in order, for example, to determine what the command comprises. In some examples, the command may comprise, for example, a timer create/delete command etc.

Utilising the decoded timer command 508, the decoder module 504 may subsequently apply previously received information, for example granularity and duration information, in order to determine a position that a timer record should be positioned in memory, for example in external memory (not shown).

In some examples, the previously received information may have been user defined. In other examples, the previously received information may have been dynamically determined by the LLDA 500. The decoder module 504 may subsequently instruct the execution module 506 to position 510 the relevant timer record in memory.

Referring to a second mode of operation, the LLDA 500 may determine that for every time tick 512 received from a clock, for example clock 212, it may instructs expiration module 501 to check whether a link list is available 514 for the current received time tick 512. If the expiration module 501 determines that there is a link list available for the current time tick 512, the LLDA 500 may be aware that some timers may need to be notified as 'expired'.

Subsequently, the LLDA 500 may instruct the expiration module 501 to determine if the available link list is empty or comprises timer information. If the expiration module 501 determines that the available link list is not empty, it may fetch the entire available link list in order to notify timers about expirations.

Figure 6:
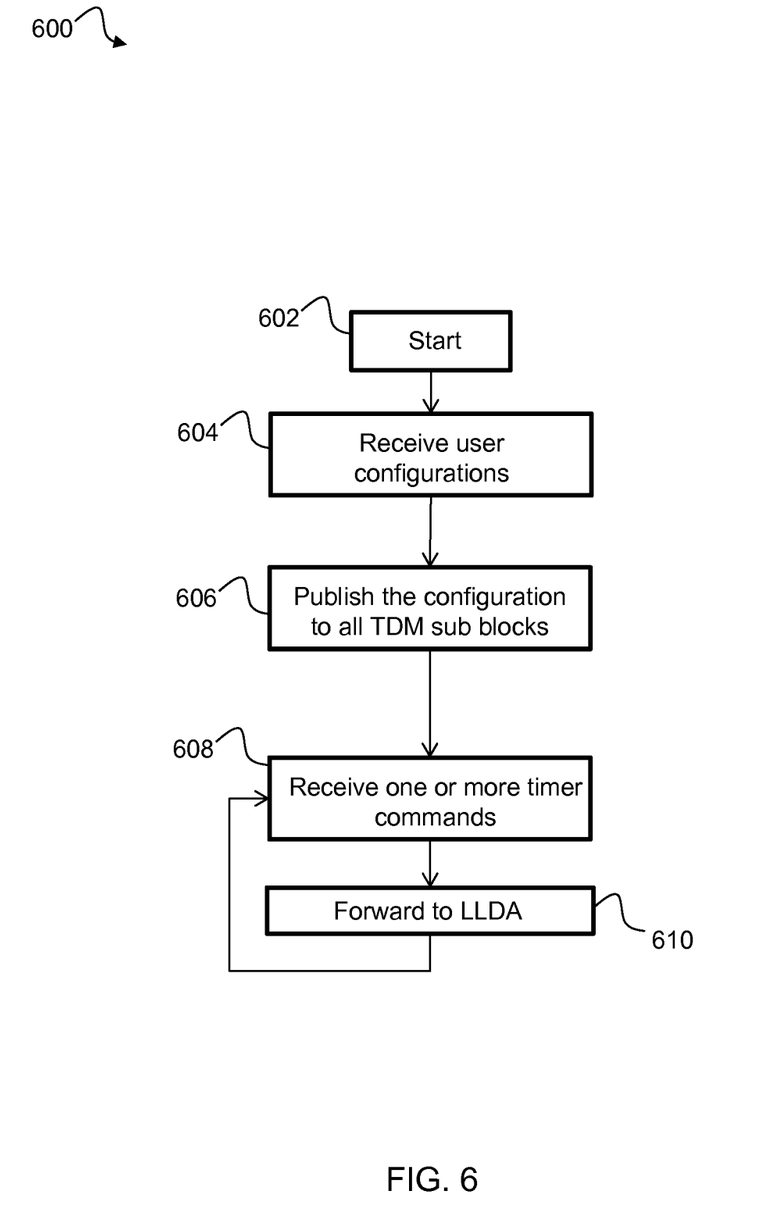
FIG. 6 illustrates an example of a simplified flow chart of a timer distribution module operation.

Referring to FIG. 6, an example of a simplified flow chart of a timer distribution module operation 600 is illustrated. Initially, at 602, the operation of the timer distribution module begins and one or more LLDAs within the TDM may be configured. At 604, the TDM may receive a user configuration, which may comprise information on a number of barriers that the user wishes to be configured for a particular application. At 606, the TDM may publish the configuration to all TDM sub blocks, for example a configuration module, clock, and command decoder.

At 608, the TDM may receive one or more timer commands from, for example, an external system host.

The TDM may then, at 610, forward information, which may comprise the determination of how to implement the one or more received timer commands to an LLDA module, for example LLDA module 214 from FIG. 2, before returning to 608.

Figure 7:
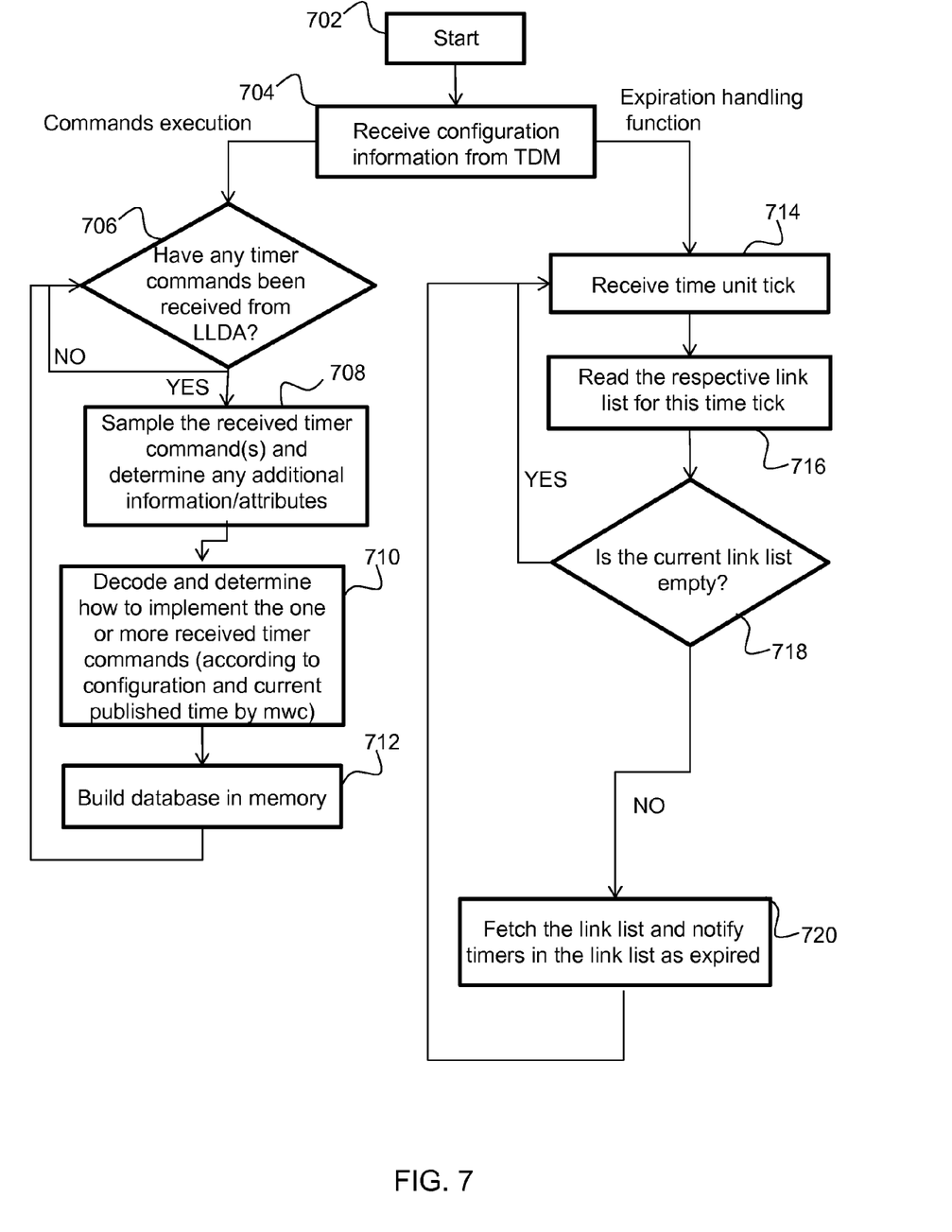
FIG. 7 illustrates an example of a simplified flow chart of a link list distribution adapter operation.

Referring to FIG. 7, an example of a simplified flow chart of a link list distribution adapter (LLDA) operation 700 is illustrated. Initially, at 702, the operation of the LLDA begins and at 704, the LLDA receives configuration information from an associated TDM. After the LLDA has been configured, the LLDA may determine whether it has received any commands.

The received information may facilitate the LLDA to perform one or both of a command execution function and an expiration handling function.

If the LLDA is operable to perform a command execution function, the LLDA may, at 706, determine whether it has received any timer commands from the TDM. If the LLDA determines at 706 that it has not received any timer commands, it may enter a loop until it receives timer commands. Otherwise, the LLDA may transition to 708, and sample the received timer command(s) and determine any additional information/attributes associated with the received information.

At 710, the LLDA may decode and determine how to implement the one or more received timer commands, which may be based on current and published time by an associated master wall clock, for example clock 212. In some examples, the timer command may be a timer create/delete command, which may be utilised to determine where a relevant timer record should be positioned. In some further examples, the supplied information may be determined dynamically by the LLDA.

At 712, the LLDA may build a database in memory, for example external memory, before transitioning back to 706.

If the LLDA is operable to perform an expiration handling function, the LLDA may, at 714, receive a time unit tick, and determine whether there is a link list available for the current received time unit tick. If the LLDA determines that there is a relevant link list available, which may mean that there are timers that should be notified as expired for the current time unit tick received at 714, the LLDA may, at 716, read the respective link list for the associated time unit tick.

At 718, the LLDA determines whether the available link list is empty. If it is determined that the link list is empty, the LLDA may transition to back to 714. Otherwise, the LLDA may transition to 720 and fetch the link list and notify timers in the link list as expired, before returning to 714.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the link list may be constructed and sent to internal memory of, say, the timer distribution module 200. In other examples, the LLDA (e.g. LLDA 214 of FIG. 2) may perform link list construction at internal memory to the timer distribution module 200, rather than external memory. In some examples, a timer context record may be created in memory internal to the timer distribution module 200 rather than being external. Alternatively, the examples may be implemented as any number of separate integrated circuits or separate devices interconnected with each other in a suitable manner.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A timer distribution module, TDM, for supporting multiple timers wherein the TDM comprises:
   a command decoder arranged to determine expiration times of a plurality of timers; and
   a timer link list distribution adapter, (a timer "LLDA"), operably coupled to the command decoder and arranged to:
   receive a time reference from a master clock;
   receive timer data from the command decoder wherein the timer data comprises at least one timer expiration link list having expiration times;
   construct a plurality of timer link lists based at least partly on the expiration times, wherein the plurality of timer link lists includes a first timer link list that includes a first number of bits;
   determine whether a first entity or a second entity is to utilize the first timer link list;
   dynamically split the first timer link list into a plurality of granularities to create a second timer link list and a third timer link list from the first timer link list, the second timer link list includes a first subset of the first number of bits and is utilized by the first entity, and the third timer link list includes a second subset of the first number of bits and is utilized by the second entity, wherein the first timer link list is dynamically split based on at least one configurable timing barrier and based on an entity to utilize the first timer link list; and
   output the second and third timer link lists.

2. The timer distribution module of claim 1 wherein the at least one configurable timing barrier is user configurable.

3. The timer distribution module of claim 1 wherein the timer LLDA is arranged to transmit the plurality of timer link lists to at least one from a group of: a memory, an output port arranged to carry an expiration notification.

4. The timer distribution module of claim 3 wherein the output port is arranged to carry an expiration notification through a dedicated event expiration bus.

5. The timer distribution module of claim 3 wherein the timer LLDA is arranged to create a timer context record to be stored in the memory.

6. The timer distribution module of claim 1 further comprising a master wall clock, a MWC, arranged to generate the time reference and a plurality of wall clock timing ticks as a physical counter to provide counter data to the timer LLDA.

7. The timer distribution module of claim 6 wherein the timer LLDA dynamically determines whether to use the time reference of the MWC in full or facilitate different granularity of the counter data where granularities are created in at least one from a group of: customised for each timer distribution module, dynamically customised during operation.

8. The timer distribution module of claim 1 wherein the timer LLDA is arranged to dynamically construct a plurality of timer link lists based at least partly on user configured timer granularity.

9. The timer distribution module of claim 1 further comprising a configuration module operably coupled to the command decoder and arranged to configure at least one barrier through a table of 'M' values.

10. The timer distribution module of claim 9 wherein a number of barriers that are configured is dependent upon a timer type being supported by the timer distribution module.

11. The timer distribution module of claim 10 wherein a single barrier is implemented to support a general purpose processor, GPP, domain application to provide for a linear distribution of timers.

12. The timer distribution module of claim 1 further comprising a plurality of timing wheels operably coupled to timer LLDA and arranged to provide the plurality of timers, wherein the timer LLDA is arranged to dynamically initiate at least one timing wheel depending on a prevailing operating condition.

13. The timer distribution module of claim 12 wherein a number of elements within the at least one timing wheel point to a timer link list that is to be split by the LLDA upon reaching a specified point in time.

14. The timer distribution module of claim 1 wherein the timer LLDA is further arranged to select a timer type application to support in the construct of a plurality of timer link lists based at least partly on the expiration times and a dynamic split of the link list timer data into a plurality of granularities based on the timer expiration link list.

15. The timer distribution module of claim 1 wherein the timer LLDA is further arranged to dynamically determine a number of barriers to be used in order to manage the linked lists at external memory.

16. The timer distribution module of claim 14 wherein the timer LLDA is further arranged to determine a timer position at the linked lists at external memory according to the configured barriers to be inserted.

17. A system on chip comprising a plurality of timer distribution modules according to claim 1, wherein each of the plurality of timer distribution modules is arranged to support a different timer type application by employing a different plurality of timing granularities.

18. A method for supporting multiple timers by a timer distribution module wherein the method comprises:
determining expiration times of a plurality of timers;
receiving a time reference from a master clock;
receiving timer data wherein the timer data comprises at least one timer expiration link list;
constructing a plurality of timer link lists based at least partly on the expiration times, wherein the plurality of timer link lists includes a first timer link list that includes a first number of bits;
determining whether a first entity or a second entity is to utilize the first timer link list;
dynamically splitting the first timer link list into a plurality of granularities to create a second timer link list and a third timer link list from the first timer link list, the second timer link list includes a first subset of the first number of bits and is utilized by the first entity, and the third timer link list includes a second subset of the first number of bits and is utilized by the second entity, wherein the first timer link list is dynamically split based on at least one configurable timing barrier and based on an entity to utilize the first timer link list; and
outputting the dynamically split timer link lists.

19. A method for supporting multiple timers by a timer distribution module wherein the method comprises:
determining expiration times of a plurality of timers;
receiving a time reference from a master clock;
receiving timer data wherein the timer data comprises at least one timer expiration link list;
constructing a plurality of timer link lists based at least partly on the expiration times,
wherein the plurality of timer link lists includes a first timer link list that includes
a first number of bits;
determining whether a first entity or a second entity is to utilize the first timer link list;
in response to determining that the first entity is to utilize the first link list, maintaining and outputting the first timer link list; and
in response to determining that the second entity is to utilize the first link list:
dynamically splitting the first timer link list into a plurality of granularities to create a second timer link list and a third timer link list from the first timer link list, the second timer link list includes a first subset of the first number of bits and the third timer link list includes a second subset of the first number of bits; and
outputting the dynamically split second and third timer link lists.

20. The method of claim 19, wherein the first entity is a general purpose processor entity, and the second entity is a networking entity.

* * * * *